(12) United States Patent
Ikebata et al.

(10) Patent No.: US 7,682,250 B2
(45) Date of Patent: Mar. 23, 2010

(54) METHOD AND APPARATUS FOR SIMULATING INTERACTIVE SPINNING BAR GYMNASTICS ON A 3D DISPLAY

(75) Inventors: Yoshihito Ikebata, Osaka (JP); Yoonjoon Lee, Redmond, WA (US); Steven Petofalvi, Redmond, WA (US); Yukimi Shimura, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 380 days.

(21) Appl. No.: 11/464,239

(22) Filed: Aug. 14, 2006

(65) Prior Publication Data

US 2007/0265083 A1    Nov. 15, 2007

Related U.S. Application Data

(60) Provisional application No. 60/746,700, filed on May 8, 2006.

(51) Int. Cl.
*A63F 9/24* (2006.01)

(52) U.S. Cl. .............. 463/31; 463/37; 345/473; 345/173

(58) Field of Classification Search ............. 463/31, 463/37; 345/473, 173
See application file for complete search history.

(56) References Cited

U.S. PATENT DOCUMENTS

| | | | | |
|---|---|---|---|---|
| 5,947,819 A | * | 9/1999 | Ohshima | 463/2 |
| 6,045,446 A | * | 4/2000 | Ohshima | 463/2 |
| 6,344,861 B1 | * | 2/2002 | Naughton et al. | 715/769 |
| 6,682,424 B2 | * | 1/2004 | Yamauchi et al. | 463/31 |
| 6,964,610 B2 | * | 11/2005 | Yamauchi et al. | 463/23 |
| 2001/0008844 A1 | * | 7/2001 | Yamauchi et al. | 463/23 |
| 2008/0026843 A1 | * | 1/2008 | Nakasaka | 463/37 |

FOREIGN PATENT DOCUMENTS

| | | | | |
|---|---|---|---|---|
| JP | 02002000939 A | * | 1/2002 | |
| JP | 2002000939 A | * | 1/2002 | |

OTHER PUBLICATIONS

Tomb Raider Chronicles Manual, <http://www.replacementdocs.com/download.php?view.5015>, Aug. 2008.*
STIC Search, Aug. 21, 2008.*
Go Play Lumberjacks, <http://wii.ign.com/objects/143/14322470.html>, Jun. 2009.*
Zhao, Peng, et al., "User Interfaces for Interactive Control of Physics-based 3D Characters," 2005 ACM 1-59593-013-2/05/0004, pp. 87-94, 221.

(Continued)

*Primary Examiner*—Dmitry Suhol
*Assistant Examiner*—Chase Leichliter
(74) *Attorney, Agent, or Firm*—Nixon & Vanderhye PC (57) ABSTRACT

The video or other computer graphics display shows, on a touch screen, a spinnable bar having a control wheel affixed to an end thereof. Strokes of a stylus applied to the surface of the wheel controls the direction and/or rate of spin of the wheel and bar. An animated game character holding on to the spinning bar may spin with the bar and perform acrobatic acts in response to other touch screen or other types of control inputs.

8 Claims, 6 Drawing Sheets

OTHER PUBLICATIONS

Perttu Hamalainen, Tommi Ilmonen, et al., "Martial Arts in Artificial Reality," CHI 2005, Apr. 2-7, 2005, Portland, Oregon, pp. 781-790.

Theobalt, Christian, et al., "Pitching a Baseball—Tracking High-Speed Motion with Multi-Exposure Images," 2004 ACM 0730-0301/04/0800-0540, pp. 540-547.

Thorne, Matthew, et al., "Motion Doodles: An Interfce for Sketching Character Motion," 2004 ACM 0730-0301/04/0800-0424, pp. 424-431.

Hodgins, Jessica K., et al., "Animating Human Athletics," 1995 ACM-0-89791-701-4/95/0008, pp. 71-78.

Faloutsos, Petros, et al., "Composable Controllers for Physics-Based Character Animation," ACM SIGGRAPH 2001, Aug. 12-17, 2001, Los Angeles, CA, pp. 251-260.

Sulejmanpašić, Adnan, et al., "Adaptation of Performed Ballistic Motion," ACM Transactions on Graphics, vol. 24, No. 1, Jan. 2005, pp. 165-179.

Liu, C. Karen, et al., "Synthesis of Complex Dynamic Character Motion from Simple Animations," 2002 ACM 1-48113-521-1/02/0007, pp. 408-416.

Fang, Anthony C., et al., "Efficient Synthesis of Physically Valid Human Motion," 2003 ACM 0730-0301/03/0700-0417, pp. 417-426.

Laszlo, Joseph, et al., "Interactive Control for Physically-Based Animation," SIGGRAPH 2000, New Orleans, LA, pp. 201-208.

Raibert, Marc H., et al., "Animation of Dynamic Legged Locomotion," Computer Graphics, vol. 25, No. 4, Jul. 1991, pp. 349-358.

Luigi's Mansion for Nintendo GameCube, Instruction Booklet, and game disk (2001).

* cited by examiner

Fig. 1A
Exemplary Illustrative
Game Play Platform

Fig. 1B
Exemplary Illustrative
Game Play Platform
Block Diagram

METHOD AND APPARATUS FOR SIMULATING INTERACTIVE SPINNING BAR GYMNASTICS ON A 3D DISPLAY

CROSS-REFERENCES TO RELATED APPLICATIONS

This application is a nonprovisional application claiming the benefit of priority from application No. 60/746,700 filed on May 8, 2006 and entitled "Method and Apparatus For Simulating Interactive Spinning Bar Gymnastics on a 3D Display", incorporated herein by reference as if expressly set forth. This application is related to commonly assigned application 60/745,892 filed Apr. 28, 2006 entitled "Touch-Controlled Game Character Motion Providing Dynamically-Positioned Virtual Control Pad" and 60/745,893 entitled "Gesture-Based Control Of Multiple Game Characters And Other Animated Objects."

STATEMENT REGARDING FEDERALLY SPONSORED RESEARCH OR DEVELOPMENT

Not applicable.

FIELD

The technology herein relates to user interfaces for interacting with a computer. More specifically, the technology herein relates to user control of rotating objects on a touch screen, and to video game play involving gymnastics and other similar effects.

BACKGROUND AND SUMMARY

Video game play is an extremely popular pastime throughout the world. Nearly every type of human endeavor is represented by some aspect of video game play. For example, driving games simulate car racing and allow the game player to feel as is he or she is behind the wheel of a race car racing at high speed around a track. Adventure games allow the game player to control a character moving through an imaginary landscape. Puzzle games present graphical or other puzzles for the game player to solve. Strategy games simulate historical battles, problems of diplomacy, or other interesting scenarios. Video game play possibilities are as limitless as the range of human interests.

Much work has been done in the past toward providing user interfaces for interactively controlling characters performing a variety of physical activities such as gymnastics, snowboarding, skiing, platform diving and the like. A few video games in the past have attempted to model or represent gymnastic moves. For example, Vivendi introduced a video game for the personal computer in 2001 called "Barbie Team Gymnastics" allowing game players to control game characters to participate in various gymnastic routines such as balance beam, floor exercises, uneven bars and the vault. Gamers often refer to the Lara Croft character in the Tomb Raider series as having "gymnastic dexterity" as the game character moves over various obstacles, climbs ladders and the like.

To make such game play action as realistic as possible, video game developers and computer graphics system designers have in the past worked tirelessly to model the underlying physics so that objects and game players move as one would expect them to move in the real world. Some very complicated and realistic animations have been developed. Video game developers have taken great pains to accurately model physical phenomena such as wind, the motion of the vehicle, the way a ball bounces on a hard surface, how an aircraft responds in flight, and other effects. For example, a character with a billowed cloak may create a parachute-like effect when that character falls, slowing the fall and allowing control of the falling character. Or a character may have to run faster to leap over a large chasm.

Many games in the past were controlled by a joystick or other type of game controller. While the player may be able to push a button or double-tap a joystick in a certain direction, indicating that the game character should, for example, run faster, the player may in some cases lack direct control over how fast the character is moving. Such less-than-fully-intuitive user interaction can sometimes result in a less satisfying game play experience.

Much work has been done in the past to improve computer and video game user interfaces and make them more intuitive. Recently, touch screens have become popular for use in controlling game play on a handheld videogame playing device. The Nintendo DS, for example, provides 3D videogame play on a touch screen that can be controlled using a stylus. To manipulate game characters or otherwise control the game, the user can touch and/or move a stylus on the surface of the touch screen. Different stylus touches and movements can control game characters to move in different ways or select other videogame play functionality. Such touch screen interfaces have become widely used and highly successful. However, further improvements are possible and desirable.

The technology herein provides techniques and apparatus for controlling gymnastic and other rotational effects within a videogame or other computer graphics or multimedia presentation using a touch screen or other user input.

In one exemplary illustrative non-limiting implementation, a gymnastics high bar is modeled using conventional 3D computer graphics techniques. The game player can control an animated game character to jump onto the high bar and perform a variety of gymnastic moves such as for example giants, handstands, fly aways, swings and turns, pirouettes, kips, and a variety of dismounts. Any particular game or other presentation can provide some or all of these moves or any other suitable acrobatic, gymnastic or other moves. In the exemplary illustrative non-limiting implementation, the touch sensitive surface is used to control the animated character. Gestures scribed by a stylus on a touch screen may, for example, be used to control the direction and type of move or other motion the animated game character performs.

In one exemplary illustrative non-limiting implementation, 3D computer graphics may be used to model a high bar that spins. This spinning bar provides a variety of interesting animation possibilities. For example, an animated character simply holding on to the spinning bar can be shown spinning with the bar—reducing the complexity of the user commands required to provide interesting and fun animated gymnastics action.

In one exemplary illustrative non-limiting implementation, a game player can cause the bar to spin through interaction with a virtual wheel attached to an end of the bar. In this exemplary illustrative non-limiting implementation, the bar is modeled as a steel or other high tensile strength bar oriented horizontally and mounted on low friction bearings. A virtual wheel is axially attached to an end of the bar. Imparting a virtual spin to the wheel causes the bar to spin. In this exemplary illustrative non-limiting implementation, the game player can impart spin to the wheel by directing touch screen stylus strokes to the wheel's surface. The faster the game player applies strokes to the wheel, the faster the wheel and associated bar spins. The effect of friction and gravity may be modeled so that the bar's spin will eventually slow down if the user does not impart strokes to the wheel for a period of time. Meanwhile, the game player can use the same stylus to control an animated character to interact with the spinning bar (e.g., mount, dismount, handstands, or other acrobatic moves).

According to an exemplary non-limiting illustrative implementation, the player instructs a game character to grasp a bar set at a height above the game level. Once the game character has grasped the bar, the player can use a device, such as a stylus, to manipulate a virtual wheel attached to the end of the bar. The player can drag the wheel up or down, and the character will spin according to the direction indicated by the player "spinning" the wheel. Once the game character is spinning, the player may then use the stylus to instruct the game character to jump in a certain direction. The game may model rotational speed (angular velocity) of the spinning character to determine just how far to jump.

According to another exemplary non-limiting illustrative implementation, the speed at which the player instructs the wheel affixed to the bar to spin affects the speed of the game character. If the player uses quick strokes to spin the bar, the game character may spin quickly. If the player slows the strokes, the spin will slow. Friction can also be modeled to gradually slow the rate at which the bar spins. If the player stops interacting with the wheel/bar then the game may slow the bar's spin down, adding the appearance of friction and/or gravity taking effect within the game. This feature allows players to directly affect the speed of the spin, in a manner where the in-game action correlates with the action taken in the real world. The player feels as if he is actually spinning the bar using the stylus. If a precision jump has to be made, the player can directly control the speed of the spin, until he feels the speed is just right, and then immediately and directly indicate using a stylus where he wants the game character to jump.

According to a further exemplary non-limiting illustrative implementation, a plurality of movement zones are pre-defined around a game character. These zones may be centered at the center of the character, and there may be any number of zones surrounding the character. For example, there may be plural zones indicating an upward movement, plural zones indicating a downward movement, and plural zones indicating movement to the left or right. When the player selects the game character by placing the stylus within a selection region, and subsequently moves the stylus through a zone, the game character may move in direction corresponding to the zone direction. See for example U.S. Patent Application No. 60/745,892 filed Apr. 28, 2006 entitled "Touch-Controlled Game Character Motion Providing Dynamically-Positioned Virtual Control Pad."

Character interaction is not limited to bars. Any sort of direct or indirect interaction using a tool such as a stylus where the speed, direction or other characteristic of the player's indication translates into game physics or action is possible. The game character could, for example, be swinging from a rope or a fixed pendulum, where the player's motions increases the swing speed. Other examples are possible.

The exemplary non-limiting illustrative implementations allow a player to directly control a game character through the use of a touch screen and stylus or similar combination. Because the player interacts directly with the character, the player gains a much greater sense of actually affecting the in-game events. Depending on the developer's desires, the player may also have to become skilled at manipulating and timing character movement with a stylus or similar device, adding a whole new challenge for players to master.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Exemplary Video Game Platform

Figure 1A:
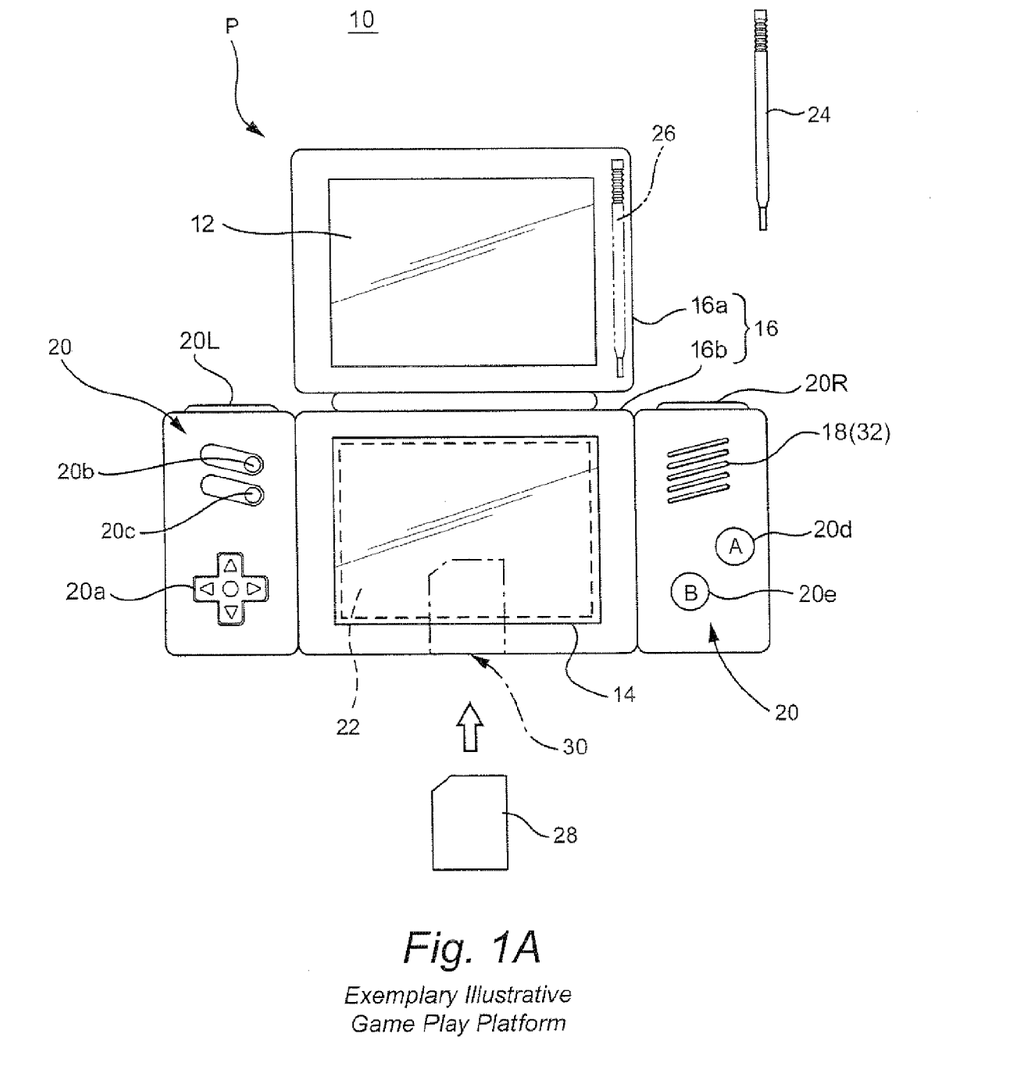
FIG. 1A is an exemplary external view of an exemplary illustrative non-limiting implementation of a game apparatus for executing a game program providing stylus-based object control.

In FIG. 1A, an exemplary illustrative non-limiting game apparatus 1 includes two liquid crystal displays (LCDs) 11 and 12, which are accommodated in a housing 18 so as to be located at predetermined positions. Specifically, in the case where the first liquid crystal display (hereinafter, referred to as the "LCD") 11 and the second LCD 12 are accommodated in a vertically stacking manner, the housing 18 includes a lower housing 18a and an upper housing 18b. The upper housing 18b is pivotably supported by a part of an upper surface of the lower housing 18a. The upper housing 18b has a planar shape slightly larger than a planar shape of the first LCD 11, and has an opening for exposing a display screen of the first LCD 11 on one main surface thereof. The lower housing 18a has a planar shape longer in the horizontal direction than the planar shape of the upper housing 18b, and has an opening for exposing a display screen of the second LCD 12 at approximately the center of the lower housing 18b in the horizontal direction. One of two side sections of the lower housing 18a interposing the second LCD 12 has speaker holes of a speaker 15, and each of the two side sections has an operation switch section 14.

The operation switch section 14 includes an operation switch (button A) 14a and an operation switch (button) 14b which are attached to one main surface of the side section of the lower housing 18a which is to the right of the second LCD 12 as seen in FIG. 1. The operation switch section 14 also includes a direction indication switch (cross key) 14c, a start switch 14d, and a select switch 14e which are attached to one main surface of the side section of the lower housing 18a to the left of the second LCD 12 as seen in FIG. 1. The lower housing 18a further includes side surface switches 14f and 14g, which are respectively provided on the upper surfaces of the side sections of the lower housing 18a to the left and to the right of the second LCD 12. When necessary, further operation switches may be provided, or unnecessary operation switches may be removed.

On an upper surface (the surface entirely shown in FIG. 1) of the second LCD 12, a touch panel 13 (surrounded by the dashed line in FIG. 1) is provided. The touch panel 13 is of, for example, any of a resistance film system, an optical (infrared) system, and a static capacitance coupling system. When a stylus 16 (or a finger) presses, moves on, or touches an upper surface of the touch panel 13, the coordinate position of the stylus 16 is detected and the coordinate data is output.

In the vicinity of a side surface of the upper housing 18b, an accommodation hole (an area represented by the two-dot chain line in FIG. 1) is formed when necessary for accommodating the stylus 16 for operating the touch panel 13. In a part of one surface of the lower housing 18a, a cartridge insertion section (an area represented by the one-dot chain line in FIG. 1) is formed, for detachably accepting a game cartridge 17 (hereinafter, referred to simply as the "cartridge 17") having a built-in memory (e.g., a ROM) which stores a game program. The cartridge 17 is a memory medium storing a game program, and is, for example, a nonvolatile semiconductor memory such as a ROM or a flash memory. A part of the lower housing 18b inner to the cartridge insertion section has a built-in connecter (see FIG. 2) to be electrically connected with the cartridge 17. The lower housing 18a (or the upper housing 18b) accommodates an electronic circuit board having various electronic components such as a CPU and the like mounted thereon. The memory medium for storing the game program is not limited to the nonvolatile semiconductor memory, but may be a CD-ROM, a DVD, or a similar optical disc-shaped memory medium.

Figure 1B:
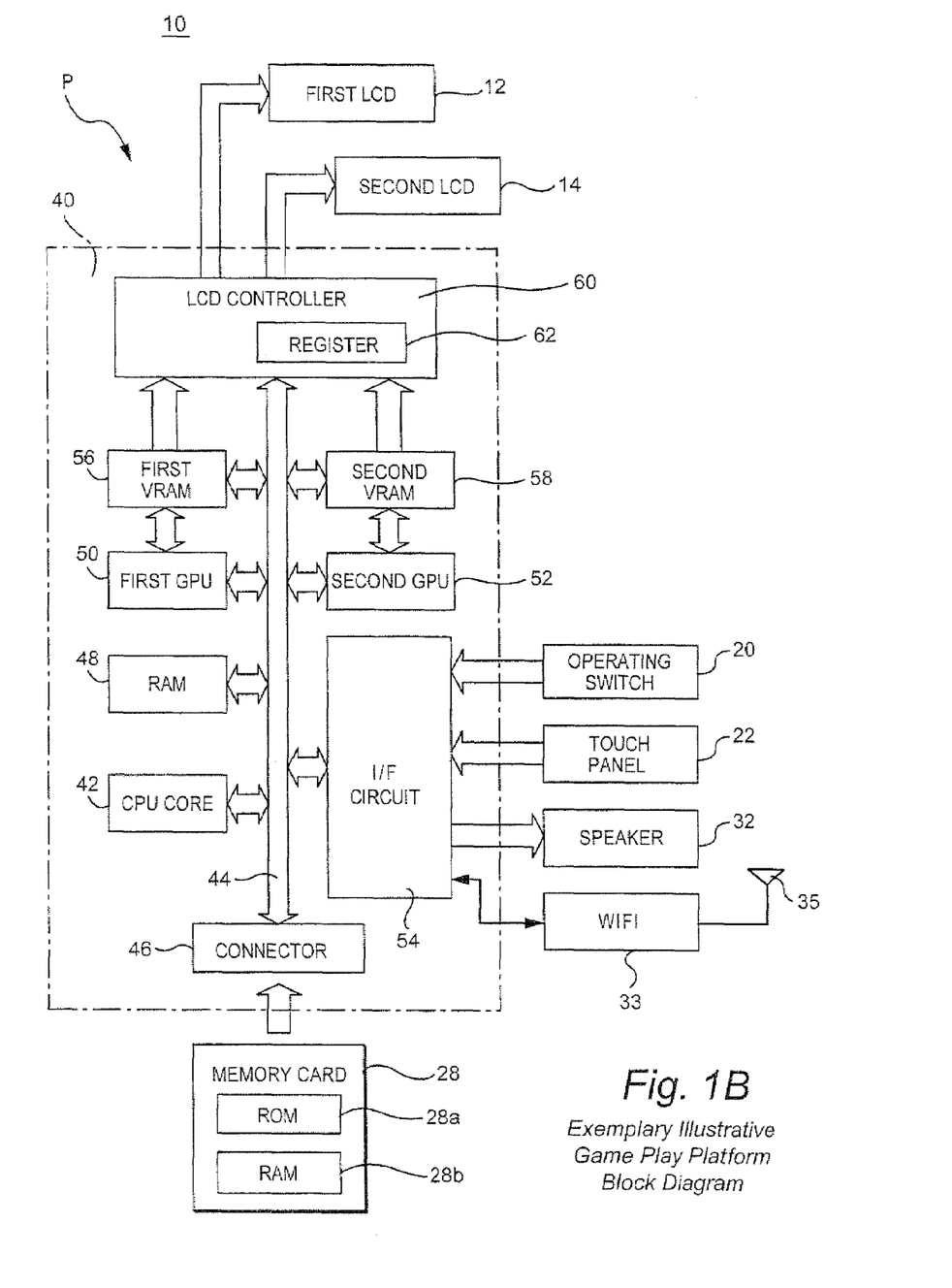
FIG. 1B is a block diagram showing an internal structure of the FIG. 1A game apparatus.

Next, with reference to FIG. 1B, an internal structure of the game apparatus 1 will be described. FIG. 1B is a block diagram showing the internal structure of the game apparatus 1.

In FIG. 1B, an electronic circuit board accommodated in the housing 18 has a CPU core 21 mounted thereon. The CPU core 21 is connected to the connector 28, to be connected to the cartridge 17, via a predetermined bus, and the CPU core 21 is also connected to an input/output interface (I/F) circuit 27, a first graphic processing unit (first GPU) 24, a second graphic processing unit (second GPU) 26, and a working RAM (WRAM) 22.

To the connecter 28, the cartridge 17 is detachably connectable. As described above, the cartridge 17 is a memory medium for storing a game program. Specifically, the cartridge 17 has a ROM 171 storing the game program and a RAM 172 rewritably storing backup data mounted thereon. The game program stored in the ROM 171 in the cartridge 17 is loaded on the WRAM 22, and the game program loaded on the WRAM 22 is executed by the CPU core 21. Temporary data and data for generating an image which are obtained by the CPU core 21 through execution of the game program are stored in the WRAM 22.

As described above, the ROM 171 stores a game program, which is a group of instructions and a group of data in the format executable by the computer of the game apparatus 1, especially by the CPU core 21. The game program is read into and executed by the WRAM 22 when necessary. In this embodiment, the game program and the like are recorded in the cartridge 17, but the game program and the like may be supplied by another medium or via a communication network.

The I/F circuit 27 is connected to the touch panel 13, the operation switch section 14, and the speaker 15. The speaker 15 is located at a position just inside the speaker holes described above.

The first GPU 24 is connected to a first video RAM (hereinafter, referred to the "VRAM") 23, and the second GPU 26 is connected to a second VRAM 25. In accordance with an instruction from the CPU core 21, the first GPU 24 generates a first game image based on data for generating an image stored in the WRAM 22 and draws the first game image in the first VRAM 23. In accordance with an instruction from the CPU core 21, the second GPU 26 generates a second game image based on data for generating an image stored in the WRAM 22 and draws the second game image in the second VRAM 25.

The first GPU 24 is connected to the first LCD 11, and the second GPU 26 is connected to the second LCD 12. In accordance with an instruction from the CPU core 21, the first GPU 24 outputs the first game image drawn in the first VRAM 23 to the first LCD 11. The first LCD 11 displays the first game image which is output from the first GPU 24. In accordance with an instruction from the CPU core 21, the second GPU 26 outputs the second game image drawn in the second VRAM 25 to the second LCD 12. The second LCD 12 displays the second game image which is output from the second GPU 26.

The I/F circuit is a circuit for exchanging data between external input/output devices such as the touch panel 13, the operation switch section 14, the speaker 15 and the like, and the CPU core 21. The touch panel 13 (including a device driver for the touch panel 13) has a coordinate system corresponding to a coordinate system of the second VRAM 25, and outputs coordinate position data corresponding to the position which is input (indicated) by the stick 16 or the like. The resolution of the display screen of the second LCD 12 is, for example, 256 dots×192 dots, and the detection precision of the touch panel 13 is 256 dots×192 dots in correspondence with the resolution of the display screen of the second LCD 12. The precision detection of the touch panel 13 may be lower or higher than the resolution of the display screen of the second LCD 12.

Exemplary Character Rotation and Movement

Figure 2A:
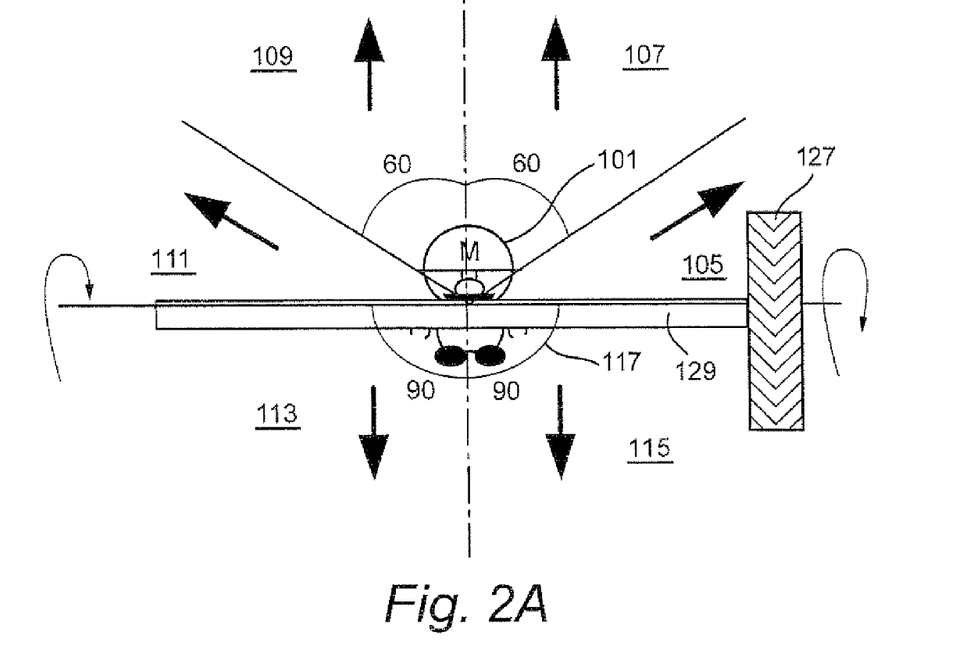
FIG. 2A is an exemplary representation of an exemplary illustrative non-limiting game character grasping a spinning bar.

According to one exemplary non-limiting illustrative embodiment shown in FIG. 2A, videogame software stored on memory card 28 or otherwise provided to videogame system 10 (e.g., via a wireless download) controls system 10 to display a game character 101 (e.g., a gymnast) grasping a bar 129.

In one exemplary illustrative non-limiting implementation, bar 127 may model a competition high bar of the type used by gymnasts throughout the world. Such "high bar" equipment may comprise for example a stainless steel bar mounted using a double cable tensioning system at a sufficient height above the floor to provide sufficient room for acrobatic moves. In some exemplary illustrative non-limiting implementations, the bar 127 need not exactly model a real world high bar, but may instead model unusual "spinning" bar equipment where the bar 127 is rotatable mounted on supports so that it spins and is capable of causing a game character holding on to it to spin along with it. In this example implementation, the bar 129 can spin relative to a 3D world. Meanwhile, game character 101 can spin with bar 129. The bar 129 thus, in the exemplary illustrative non-limiting implementation, only roughly models a real gymnastic high bar on which a gymnast can perform feats of gymnastic skill. In other exemplary illustrative non-limiting implementations, however, the modeling can be made more accurate to a real world high bar or other piece of gymnastic or other equipment.

The exemplary illustrative non-limiting implementation simulates a physically rotatable horizontally oriented bar 129 having fixed thereto a wheel 127 that the game player can manipulate to control the spin of the bar. By touching the area of touch-sensitive display 22 immediately over the depiction of wheel 127 with a vertical upward or downward stroke, the game player can cause the bar to rotate in a clockwise or counterclockwise direction. An upwardly-directed stroke may for example cause the bar to rotate in a clockwise direction (as one looks at the wheel axially), and a downward stroke directed to the wheel may cause the bar to rotate in a counterclockwise (with reference to an axial end view of the wheel). In the exemplary illustrative non-limiting implementation, the touch screen 22 cannot detect force but only touch, so that the exemplary illustrative non-limiting implementation uses repetitive strokes to allow the game player to apply rotational force to the spin of wheel 127 and thus to the bar. The more strokes the game player applies to wheel 127 in the same direction, the faster the wheel and associated bar spins. If the player applies a stroke in a different direction from the direction which the bar is currently spinning, the result can be a decrease in the rate of spin. If the game player leaves the wheel alone for a while and does not apply any stroke, the wheel 127 and associated bar may eventually and gradually decrease its rate of spin and finally come to rest. The rate at which the wheel and bar decrease their spin may be programmed to model a desired mass, angular momentum, friction factor and other physical factors. The appearance of the spinning wheel 127 may be textured to provide a perception that the game player is actually engaging a rough circumferential surface of the wheel 127 with stylus 24.

As shown in FIGS. 2A-2C, once the game player has used stylus 24 to start the wheel 127 and associated bar spinning, he or she may use the same stylus to cause a game character to do acrobatics from the bar such as for example to leap from the spinning bar and catch it again, to leap off of the spinning bar or the like. In the example scenario shown in FIG. 2A, if the player wishes to move the game character 101 away from the bar 129, the player indicates a direction in which he wishes the character to move. If the game character is displayed on touch-screen 22, for example, the player can indicate a direction in which the character is to move using stylus 24. The player can place stylus 24 in a selection zone to indicate that the player has selected the game character for movement and a particular direction in which to move. Gestures may also be used to direct particular moves (e.g., mount, dismount, giant, etc.).

Figure 2B:
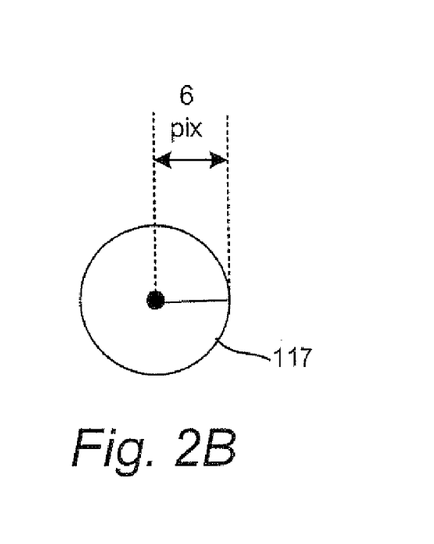
FIG. 2B is an exemplary representation of an allowance zone for a control point.

An exemplary selection zone is shown in FIG. 2B. According to the example in FIG. 2B, the center 115 of the zone is centered at the center of the game character 101. Some degree of allowance 117 may also be provided around the zone so that the player does not have to indicate a single point 115 exactly with the stylus. As long as the player places the tip of the stylus within the area of allowance 117, the game will know that the player wishes to select the character for control. In the particular illustrative example shown, the tolerance is six pixels, although this amount can be varied with the desired degree of difficulty in player selection. For example, if the developer wishes that the player should make very precise movements for a difficult part of the game, this area 117 may be decreased accordingly. In the exemplary illustrative non-limiting implementation, the allowance is larger when the bar is spinning than when it is not spinning. For example, in one exemplary illustrative non-limiting implementation, the allowance may be set to a value such as 4 pixels in any direction when the character is not spinning, standing, idling, walking or the like. However, as soon as the character begins to spin, the allowance may be increased to a larger value (e.g., 6 pixels each way). These values are just examples—any number can be chosen by the designer. By providing an increased allowance when the character is spinning, it becomes easier for the game player to control a rapidly moving or animated game player.

According to this exemplary illustrative non-limiting implementation, once the player has selected the game character for movement, the player may then indicate a direction in which the game character is to be moved and possibly also the type of movement desired. In the exemplary movement zones shown in FIG. 2A, there are six possible movement zones with four possible movement directions. If, after selecting the character, the player moves the stylus through zones 107 or 109 the character may jump upwards from the bar. The height of this jump may be affected by how fast the bar is currently spinning. If the player moves the stylus through zones 105 or 111, the character may jump right or left respectively. If the player wishes the character to dismount, he can move the stylus through zones 103 or 113. The speed the bar is rotating can affect the speed at which the character leaves the bar. If the game character has to, for example, smash into a block hard enough before the block gives way, allowing passage to a new section of the game, the player may cause the character to achieve some level of speed on the bar and then instruct the character to dismount forcefully. In the example shown in FIG. 2A, by way of non-limiting example only, regions 107 and 109 are 60 degrees, 105 and 111 are 30 degrees, and 103 and 113 are 90 degrees. This can vary with both the number of regions and the desire of the developer to make motion in a particular direction difficult. If the challenge of a portion of the game is a precise jump, then a region of only a few degrees in the appropriate direction may be provided.

Figure 3A:
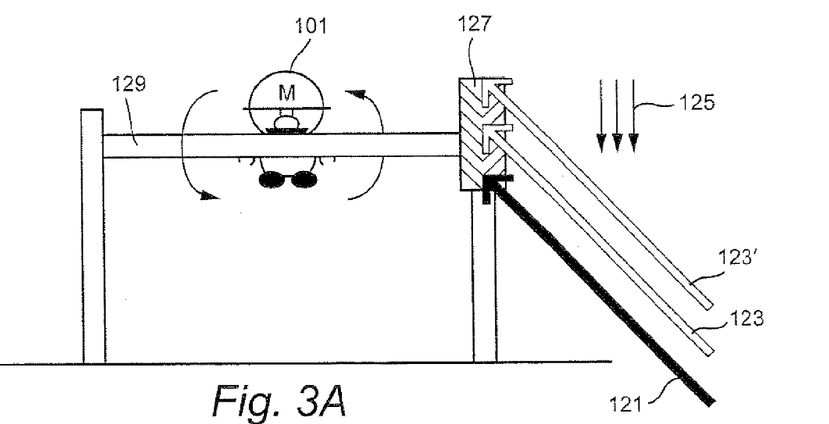
FIG. 3A is an exemplary representation of an exemplary illustrative non-limiting movable game character in a virtual gamespace interacting with a spinning bar.
Figure 3B:
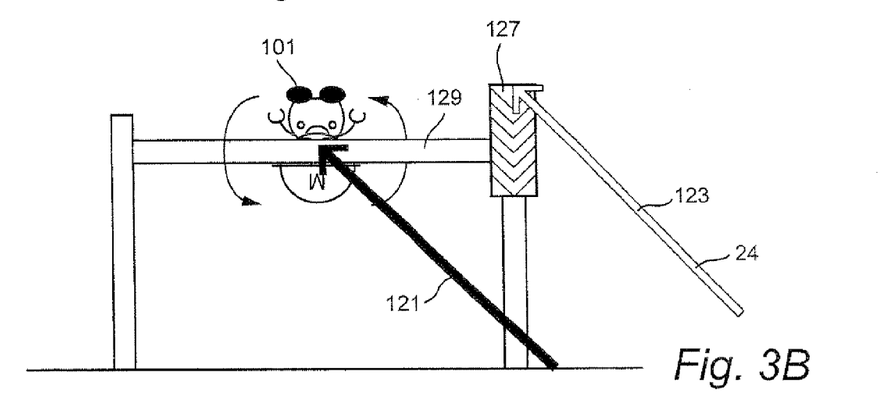
FIG. 3B is an exemplary representation of the selection of a movable game character that has been rotated.
Figure 3C:
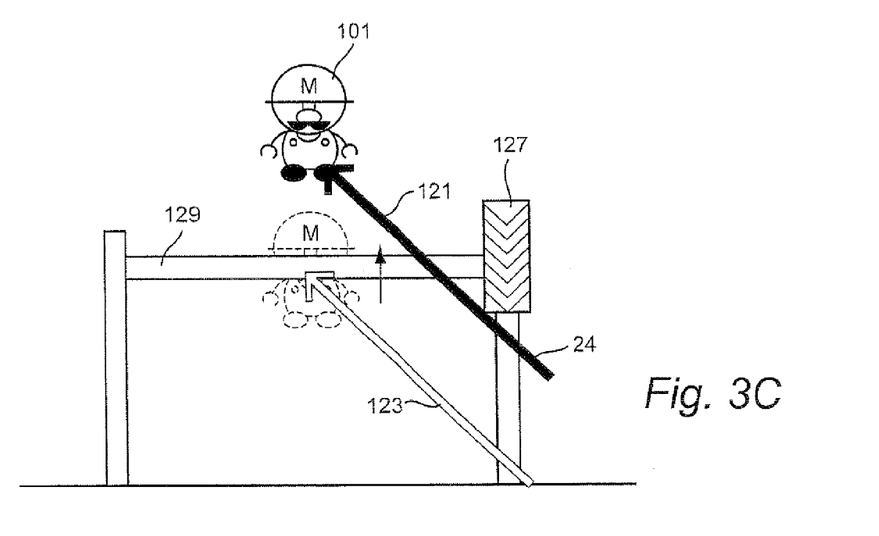
FIG. 3C is an exemplary representation of a movable game character in a virtual gamespace moving in a user indicated direction.

In the exemplary non-limiting illustrative implementation shown in FIGS. 3A, 3B and 3C, the player instructs a bar 129 displayed in the game space to spin, by manipulating a wheel 127 also displayed in the game space, with stylus 24. Although the axis of the wheel 127 is aligned with the axis of the bar 129 in this example, the wheel or bar could also be displayed from other perspectives, and their axes connected by gears or an unseen connection.

FIG. 3A shows an exemplary representation of a player interacting with the wheel 127 in order to cause the bar to spin. The dark arrow 121 represents the current position of the stylus, while the light arrows 123 represent previous stylus positions. The stylus 121 is translated in a downward motion 125 with the tip touching the wheel 127. If the wheel were displayed perpendicularly to the bar, then the player may move stylus 24 in a circular motion. The player's motion causes the wheel 127 to begin to rotate in the same direction 125 as the motion, which in turn causes the bar 129, and the game character 101 grasping the bar, to rotate 131 about the bar's axis. The bar may simply have a single speed, or the developer may wish the player's repeated strokes to increase or decrease bar speed. As one example, the bar may have four speeds. Every fourth stroke of the player may move the bar up to the next speed level. Additionally, if the player is idle for a certain period of time, say forty updates, where an update is when the game checks for input, the bar may move down a speed level, simulating the effects of friction and gravity.

According to this example of this implementation, if the bar is in state 0 of the index, then the bar is at its slowest motion speed. As the bar state moves up or down in speed state, the rate at which the bar is spinning will accelerate or decelerate respectively. Additionally, when the bar moves from a motionless state to state 0, the animation may process on the next update, when the bar moves to state 1, the animation may process immediately, without waiting for the next update. In the same fashion, when the bar moves to state 2, the animation will again wait for the next update, and the switch to state 3 will process immediately. This can create a sense of acceleration and deceleration with a few simple frames of flip-book like animation.

This implementation also allows the speed of the player's strokes to affect the speed at which the bar accelerates or decelerates. If the strokes are input and processed rapidly, then the player appears to have quickly spun the bar through a series of rapid hand movements. If the strokes are input slowly, however, the bar takes longer to get to a maximum speed due to the slower input of spin instructions.

FIG. 3B is an exemplary representation of the selection of a character 101 which has been rotated through manipulation of the wheel. Once the desired spin speed has been reached, the player moves the stylus 121 from a former position 123, where the tip was touching the wheel, to a new position 121, where the tip is within the selection region of the game character 101. Using the stylus, the player can now indicate a direction or other action in which he desires the game character to move. An aspect of skill can be added here, especially if the bar slows down quickly, for the player must then quickly cease manipulation of the wheel to spin the bar and rapidly select and instruct character movement.

FIG. 3C is an exemplary representation of the game character 101 moving in a direction 133 indicated by the player. The player, after having positioned the stylus at a point 123 where the tip was within the selection zone of the game character 101, translates the stylus 121 towards the top of the screen, moving it to a new position 121. The game character 101 moves in the direction indicated by the stylus 121, and its speed and height achieved may depend on the speed at which the bar was spinning when the character let go or otherwise became decoupled from the bar.

Figure 4A:
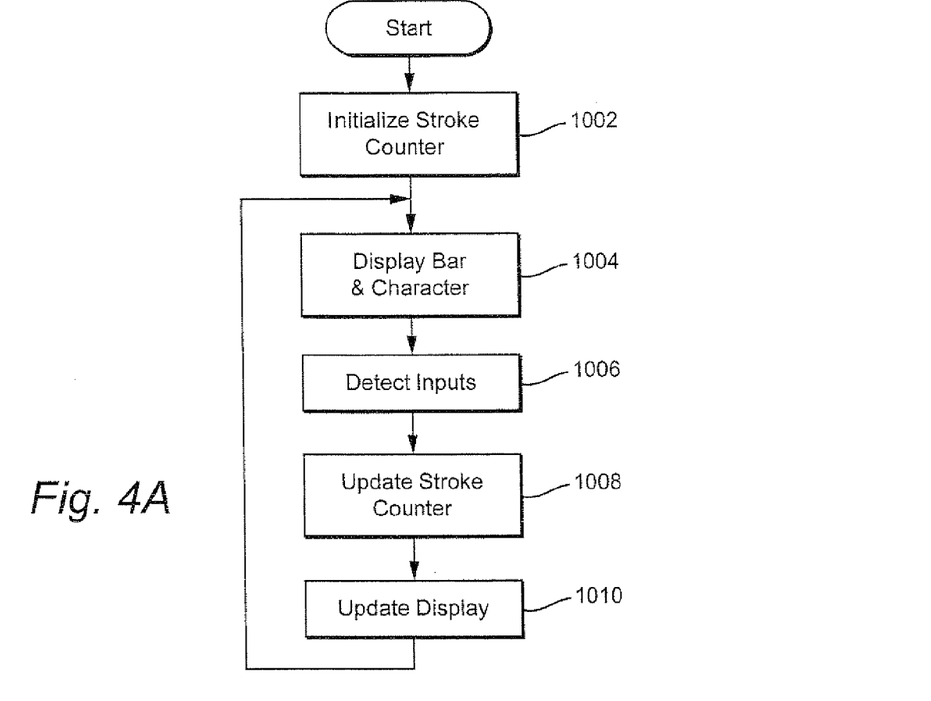
FIGS. 4A-4C are flowcharts of exemplary illustrative non-limiting program control steps.
Figure 4B:
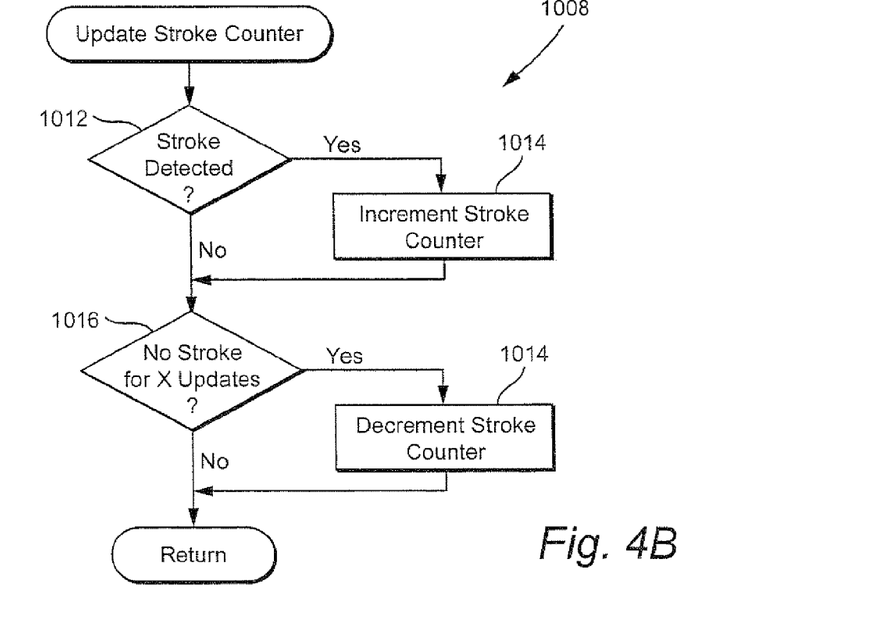
Figure 4C:
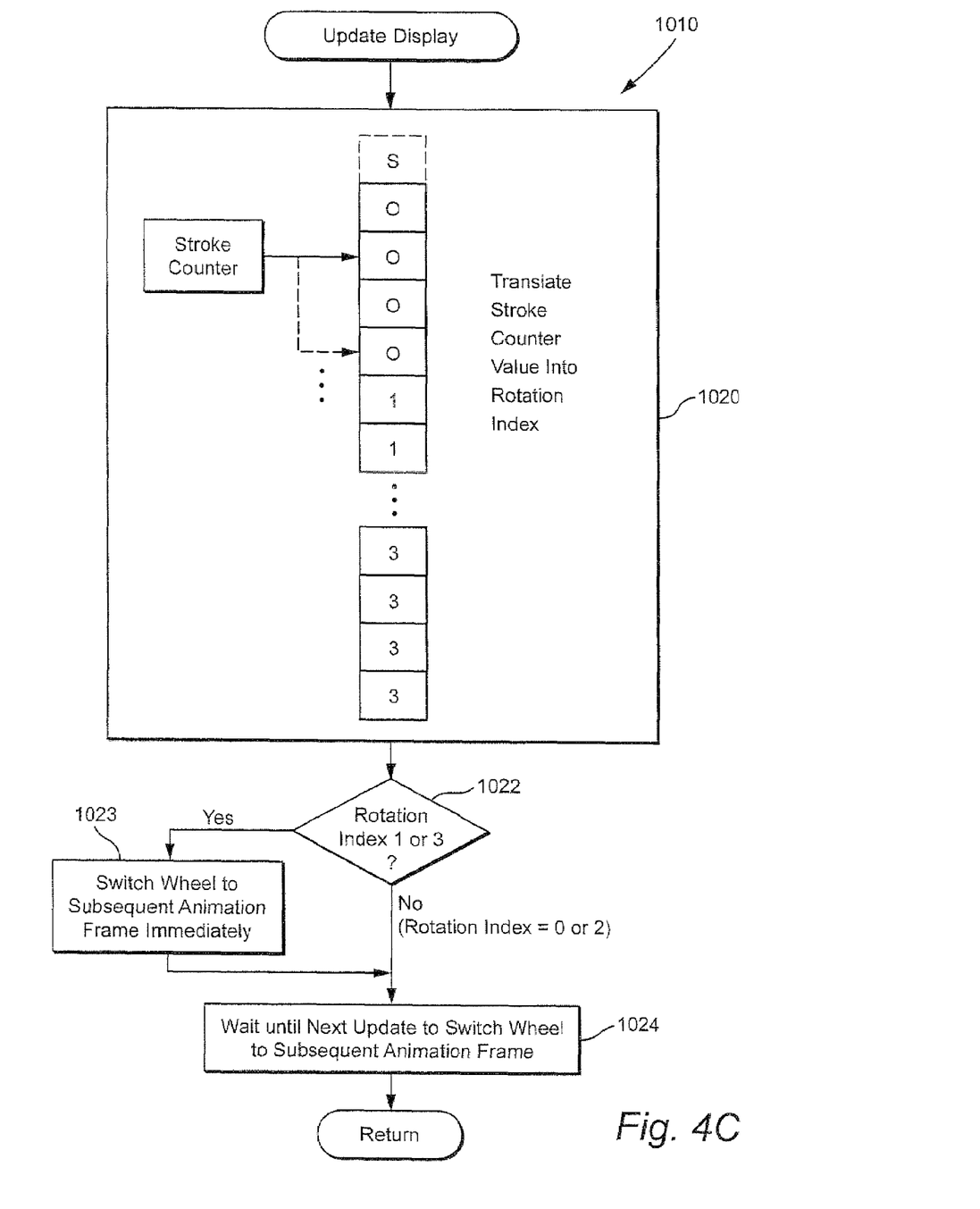

FIGS. 4A-4C are flowcharts of exemplary illustrative non-limiting program control steps performed by CPU core 42 in conjunction with GPU's 50, 52 and other components to provide the display effects described above. Referring to FIG. 4A, CPU core 42 initializes a stroke counter to a predetermined initial value (e.g., 0) (block 1002) and then displays the bar in character as shown in FIG. 3A (block 1004). The CPU core 42 may then, via interface circuit 54, detect inputs from touch panel 22 and operating switch 20 (block 1006) and update the stroke counter in accordance with such inputs (block 1008). CPU core 42 in conjunction with GPU's 50, 52 may then update the displays 12, 14 (block 1010) and repeat the steps described above.

FIG. 4B shows an example illustrative non-limiting implementation of the update stroke counter routine if block 1008. In this particular illustrative exemplary non-limiting implementation, there are a total of four degrees of speed for the spinning wheel 127. In one exemplary illustrative non-limiting implementation, it take a predetermined number of strokes by stylus 24 (e.g., 4 strokes) to increase by a degree of speed. In one exemplary illustrative non-limiting implementation, a certain predetermined total number of strokes of stylus 24 (e.g., 16 strokes) will cause the wheel 127 to spin at a top speed. In the exemplary illustrative non-limiting implementation, if a stroke is detected (decision block 1012), then CPU core 42 increments the stroke counter (block 1014). If there has been no stroke or other control input for certain number of update, loop or polling periods (e.g., 40 updates) (decision block 1016), the stroke counter is decreased (e.g., by 1)—modeling artificial friction that causes the wheel 127 to slow down and eventually to stop (block 1018). This exemplary illustrative non-limiting scheme creates a sense of acceleration and deceleration with just a few frames of a simple flipbook animation.

FIG. 4C shows an exemplary illustrative non-limiting implementation of an "update display" routine 1010. In this example, the stroke counter value is translated into a rotation index using an array (block 1020). In a particular example shown, incrementing the stroke counter by one causes the stroke counter to index to the next successive entry in the array. Once the stroke counter has been incremented to a maximum value in the illustrative exemplary non-limiting implementation, it is incremented no further and remains at that maximum even in response to further stroke inputs. In this particular example, the first to fourth strokes will return rotation index 0, the fifth to eighth strokes will return rotation index 1, and so one. In the exemplary illustrative non-limiting implementation, the rotation index not only represents the rotational speed, but also is used to update the animation accordingly. For example, in this exemplary illustrative non-limiting implementation:

rotation index 0: on next update, the wheel switches to next frame of animation rotation index 1: the wheel switches to next frame of animation immediately rotation index 2: on next update, the wheel goes to the next of next frame of animation (i.e., it skips a frame and progresses to a second subsequent frame)

rotation index 3: the wheel goes to the next of next frame of animation immediately (e.g., it immediately progresses to a second subsequent frame without waiting for an update).

The above operations are represented schematically by FIG. 4C blocks 1022-1024. In this particular exemplary illustrative non-limiting implementation, if the rotation index is 1 or 3 ("yes" exit to decision block 1022), CPU core 42 switches the wheel to a subsequent animation frame immediately—with a rotation index of 1 switching to a next successive animation frame; and a rotation index of 3 switching to a second subsequent animation frame (thereby skipping a frame) (block 1023). If the rotation index is 0 or 2 ("no" exit to decision block 1022), then CPU core 42 will wait until the next update to switch the wheel to a subsequent animation frame (block 1024)—with a rotation index of 0 switching to a next frame and a rotation index of 2 switching to a second subsequent frame (thereby skipping an intermediate frame).

If desired, the array shown in block 1020 can be expanded to include a "stop" (F) entry to indicate when the wheel 127 has stopped rotating such that the wheel display animation should not be updated but should remain the same. Alternatively, a different mechanism could be used to suppress the "update display" routine 1010 from operating when the stroke counter has decremented to a minimum value such that the rotating wheel 127 is at a complete standstill and is not rotating at all. In some exemplary illustrative non-limiting implementations, it may be desirable to have the rotating wheel rotate at least slowly at all times. In other exemplary illustrative non-limiting implementations, the friction of bearings and other contact surfaces may be modeled by allowing the wheel to eventually slow down to a complete stop if the user has not applied a stroke to keep the wheel moving for awhile.

The described implementations give the player a feeling of direct control over various aspects of in-game events. The player, through the speed of his motions, can affect the speed at which the character spins. Also, the player's motions can directly translate into the motions of a wheel and a bar, allowing the player to feel as if he has directly manipulated the virtual objects. The player can pick the precise moment at which to cause the character to leap from the bar, and can control that leap directly, enhancing the player's feeling of control. Any of these direct control aspects can be changed or limited by the developer in accordance with the particular game to be played, and additional direct control aspects, as previously noted, can be provided.

Although the exemplary illustrative non-limiting implementations described above make use of the stylus 24 and touch screen 22, alternative implementations using other types of control inputs (e.g., joysticks, pointing devices, push buttons, voice control or any other convenient inputs) may be provided. While rotation in the exemplary illustrative non-limiting implementations described above model a spinning bar with a wheel fixed to its end, other geometries are possible. Any elongated or other type of object may be caused to spin. Examples include a bicycle wheel, a satellite in space, a top, an airplane propeller or any other rotational object in the real or imaginary world. While the exemplary illustrative non-limiting implementation described above permits rotation in either direction (clockwise or counterclockwise), other exemplary illustrative non-limiting implementation might only provide rotation in a single direction. While the exemplary illustrative non-limiting implementation described above fixes the other degrees of freedom of the spinning bar beyond rotation, other implementations can allow the user to control the orientation and any or all of the other five degrees of freedom.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A method for modeling a gymnastic exercise comprising:
    displaying an animated game character holding on to an elongated object, the animated game character being moveable independently of said elongated object;
    detecting user manipulation of a control input device;
    determining, in response to said detected user manipulation, whether said user in manipulating said control input device has supplied a gesture simulating touch imparting a push to said elongated object;
    using animation to cause said displayed elongated object to appear to spin with an angular momentum so that repeated gestures simulating pushes in the direction of spin increase the apparent rate said virtual object spins;
    using animation to make the displayed elongated object appear to impart spin to said independently-movable animated game character so that said animated game character appears to spin with the spinning elongated object; and
    changing the rate of the spin of said elongated object in response at least in part to the detected control input.

2. The method as in claim 1 further including skipping animation frames to impart the appearance of a more rapid spin in response to at least a predetermined number of control inputs occurring within a certain time period.

3. The method as in claim 2 further including calculating a rotation index in response to a stroke count, and using the rotation index to determine when to switch to a next animation frame.

4. The method as in claim 1 including calculating a rotation index based at least in part on a stroke count.

5. The method as in claim 1 wherein said detecting includes detecting stroke inputs on a touch screen.

6. . The method of claim 1, further including moving the independently movable animated game character in response to user manipulation of a control input device.

7. A method of simulating gymnastic exercise comprising:
    displaying, on a 3D computer graphics display, a representation of an elongated object having first and second ends and a wheel affixed axially to said first end thereof;
    detecting touch screen stroke inputs to determine whether said touch screen stroke inputs comprise a gesture imparting spin to said wheel and, in response thereto, imparting spin at a controlled rate to said wheel and the affixed elongated object with an angular momentum so that repeated gestures in the direction of spin increase the apparent rate said elongated object spins;
    animating, on said display, an avatar holding on to said elongated object, said avatar being movable independently of said elongated object but also capable of simulating holding said elongated object to thereby begin spinning with said elongated object, and displaying said avatar to appear to spin with said elongated object; and
    detecting other touch screen inputs and, in response to a further recognized gesture, controlling said avatar to release its hold on said elongated object and jump off of said spinning elongated object.

8. A method of simulating rotation of a virtual object on a graphical display, comprising:
    displaying at least one virtual object and an independently-moveable game character on a graphical display, the virtual object comprising a virtual game play inanimate elongated object and the independently-moveable game character is an avatar configured to move independently of the virtual game play inanimate elongated object;
    detecting stroke inputs a user provides by manipulating an input device;
    determining whether the detected stroke inputs comprise gestures simulating imparting rotational motion to the at least one virtual object;
    animating said displayed virtual object to spin at a rate that is responsive to detected stroke inputs determined to comprise gestures simulating the imparting of rotational motion to the at least one virtual object; and
    using animation to simulate the spinning virtual object appearing to impart rotational motion to the independently-movable game character in simulated contact with said rotating virtual object;
    determining whether the detected stroke inputs comprise a gesture indicating said independently-movable game character should dismount from said rotating virtual object; and
    if said detected stroke inputs are determined to comprise a gesture indicating dismount, using animation to simulate said independently-movable game character dismounting from said rotating virtual object.

* * * * *